United States Patent
Bosch et al.

(10) Patent No.: US 7,818,001 B2
(45) Date of Patent: Oct. 19, 2010

(54) FINE GRAIN DOWNLINK ACTIVE SET CONTROL

(75) Inventors: Peter Bosch, New Providence, NJ (US); Francis Joseph Mullany, Blackrock (IE); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/089,353

(22) Filed: Mar. 25, 2005

(65) Prior Publication Data

US 2006/0217119 A1 Sep. 28, 2006

(51) Int. Cl.
*H04W 4/00* (2009.01)

(52) U.S. Cl. ............... 455/434; 455/67.11; 455/423; 455/436; 455/435.2; 455/421; 370/328; 370/331

(58) Field of Classification Search ............. 455/432.1, 455/435.1, 435.2, 436–442, 525, 522, 67.11, 455/67.13, 450, 69, 423, 502; 370/331–333, 370/338

See application file for complete search history.

(56) References Cited

U.S. PATENT DOCUMENTS

| | | | | | |
|---|---|---|---|---|---|
| 5,267,261 | A | * | 11/1993 | Blakeney et al. | 370/332 |
| 5,268,933 | A | * | 12/1993 | Averbuch | 375/356 |
| 5,499,386 | A | * | 3/1996 | Karlsson | 455/444 |
| 5,742,588 | A | * | 4/1998 | Thornberg et al. | 370/236 |
| 7,031,701 | B1 | * | 4/2006 | Ahmavaara et al. | 455/423 |
| 7,065,359 | B2 | * | 6/2006 | Chuah et al. | 455/436 |
| 7,079,859 | B2 | * | 7/2006 | Nobukiyo et al. | 455/522 |
| 7,133,682 | B2 | * | 11/2006 | Seki et al. | 455/450 |
| 7,180,878 | B1 | * | 2/2007 | Salonaho | 370/331 |
| 7,184,792 | B2 | * | 2/2007 | Mir | 455/522 |
| 7,224,977 | B2 | * | 5/2007 | Cavalli et al. | 455/452.1 |
| 7,363,010 | B2 | * | 4/2008 | Oh et al. | 455/67.11 |
| 7,535,932 | B2 | * | 5/2009 | Ishii et al. | 370/509 |
| 2002/0025816 | A1 | * | 2/2002 | Johansson et al. | 455/436 |
| 2003/0013448 | A1 | * | 1/2003 | Dillinger et al. | 455/437 |
| 2005/0157658 | A1 | * | 7/2005 | Ishii et al. | 370/252 |
| 2006/0217119 | A1 | * | 9/2006 | Bosch et al. | 455/435.2 |
| 2007/0025301 | A1 | * | 2/2007 | Petersson et al. | 370/338 |
| 2008/0039106 | A1 | * | 2/2008 | Wallentin et al. | 455/450 |
| 2008/0090572 | A1 | * | 4/2008 | Cha et al. | 455/436 |

OTHER PUBLICATIONS

3rd Generation Partnership Project; Technical Specification Group Radio Access Network; Multiplexing and channel coding (FDD) (Release 4), Technical specification, 3GPP TS 25.212 V4.5.0 (Jun. 2002).

3rd Generation Partnership Project; Technical Specification Group Services and system Aspects; Vocabulary for 3GPP Specifications (Release 1999),Technical Report, 3G TR 21.905 v3.3.0 (Oct. 2001).

(Continued)

*Primary Examiner*—Sharad Rampuria
(74) *Attorney, Agent, or Firm*—Harness, Dickey & Pierce

(57) ABSTRACT

An active set of base stations may be controlled based on whether data is unavailable at base stations within the active set. The base station may transmit an indicator indicating whether data is unavailable at the base station and/or a mobile station may monitor a channel characteristic of at least a portion of a channel between the base station and the mobile station.

18 Claims, 4 Drawing Sheets

OTHER PUBLICATIONS

3rd Generation Partnership Project (3GPP); Technical Specification Group (TSG) Radio Access Network (RAN); Working Group 1 (WG1); Physical layer-General description TS 25. 201 v2.3.0 (Oct. 1999).

3rd Generation Partnership project; Technical Specification Group Radio Access Networks; UE Radio Transmission and Reception (TDD) (Release 1999), TS 25.102 V3.12.0 (Sep. 2002).

3rd Generation Partnership Project; Technical Specification Group Radio Access networks; User Equipment (UE) radio transmission and reception (FDD) (Release 1999) 3GPP TS 25.101 V3.17.0 (Mar. 2004).

Universal Mobile Telecommunications System (UMTS); FDD enhanced uplink; Overall description; Stage 2 (3GPP TS 25.309 version 6.1.0 Release 6) ETSI TS 125 309 v6.1.0 (Dec. 2004).

Overview of 3GPP Release 5, Summary of all Release 5 Features, ETSI Mobile Competence Centre, 2003 Version 9th Sep. 2003.

* cited by examiner

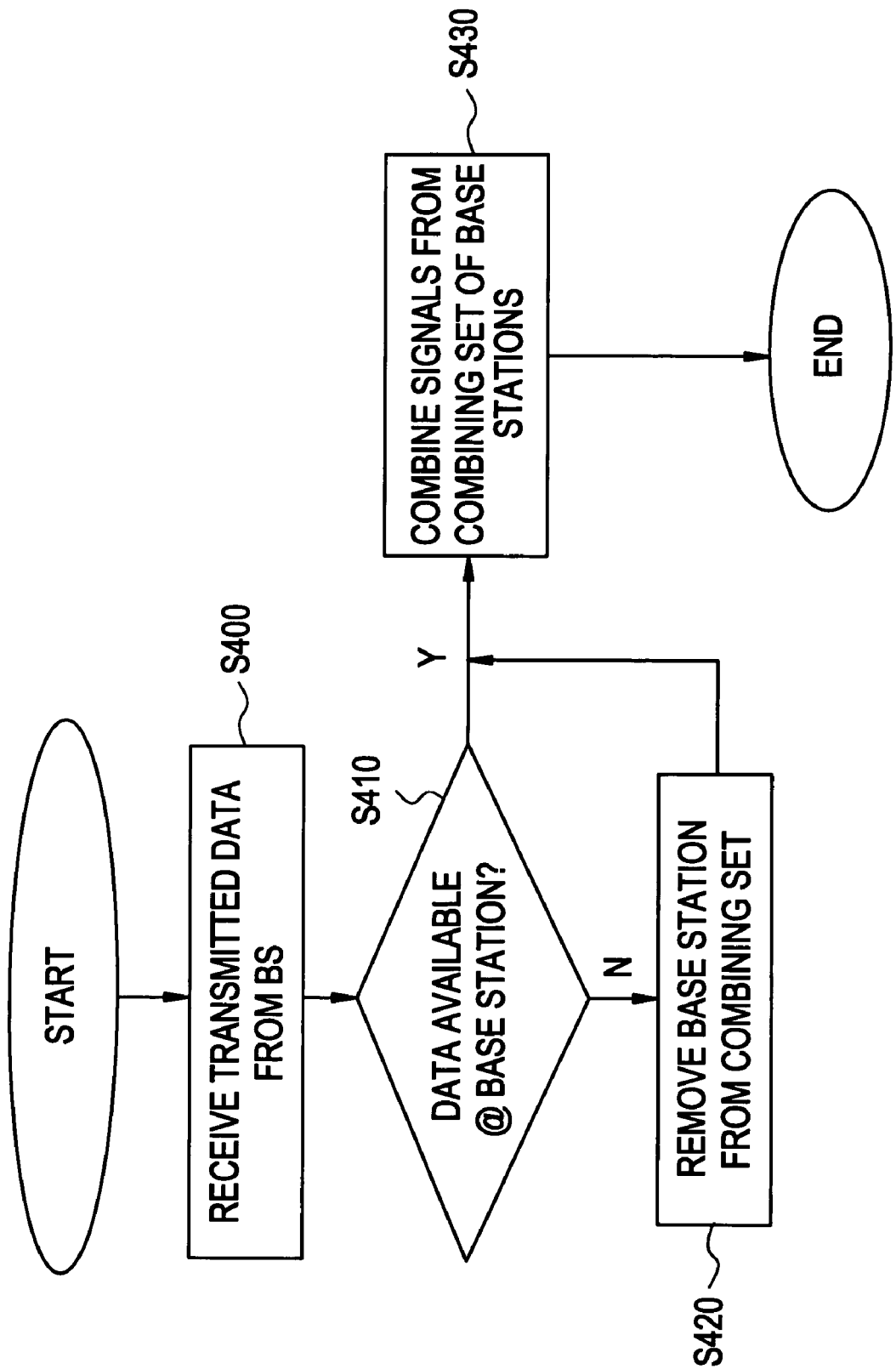

FINE GRAIN DOWNLINK ACTIVE SET CONTROL

BACKGROUND OF THE INVENTION

In conventional radio access networks, a mobile station may be in a soft-handover state and may receive information from a plurality of base stations (e.g., over multiple legs) simultaneously. Each base station transmitting to the mobile station simultaneously may be known as a serving base station, and collectively, the base stations may be referred to as an active set of serving base stations.

In operation, a message, destined for a mobile station, may be divided into a plurality of packets and transmitted from a radio network controller (RNC) to an active set of serving base stations.

At the serving base stations, transmission time intervals (TTIs) may be scheduled for receiving packets from the radio network controller at each of the base stations. For example, a stateful synchronous protocol (e.g., a framing protocol) may be used for delivering packets on time in the downlink direction. Acceptable reception times may be a timing window during which each base station may expect packets to arrive from the radio network controller.

If the radio access network is operating normally, each of the base stations in the active set may transmit the received packets associated with the message to the mobile station (e.g., over multiple legs), and the mobile station may combine the packets received from each base station (e.g., soft combine) to recreate the original transmitted message. The mobile station may then decode the message.

If the radio access network becomes congested, base stations within the radio access network may not receive packets from the radio network controller within the appropriate time window. If the base stations do not receive each of the packets within a corresponding appropriate time window, the base stations may assume that the radio network controller did not transmit any information, and subsequently may not transmit information to the mobile station.

At the mobile a determination may be made as to which base stations have transmitted data based on the relative strength of a pilot channel transmitted separately of the data channel. If the radio access network becomes congested, on or more base stations may not transmit data, but may still transmit a sufficiently strong pilot signal and thus may remain in the active set. The mobile station may then combine data actually received from base stations in the active set and noise received from the one or more base stations, which did not transmit data. This may further degrade the efficiency of the radio access network, for example, by degrading the efficiency of the wireless channel through which the data has been received.

SUMMARY OF THE INVENTION

Example embodiments of the present invention provide methods for active set control in, for example, a radio access network.

In an example embodiment of the present invention, an active set of base stations may be determined based on whether data is unavailable at at least one base station.

In another example embodiment of the present invention, an active set may be controlled by transmitting an indicator indicating whether to include at least one base station in an active set of base stations.

In example embodiments of the present invention, the base station may be temporarily excluded from the active set of base stations if data is unavailable at the base station and/or if an indicator indicates that data is unavailable at the base station.

In example embodiments of the present invention, an indicator may be received from at least one base station indicating whether data is unavailable at the base station. The active set of base stations may be determined based on the received indicator. The indicator may be, for example, a power control bit or pattern of bits and/or a transport format indicator value.

In example embodiments of the present invention, an indicator may be received from each of a plurality of base stations, and the indicator may indicate whether data is unavailable at an associated base station. The active set of base stations may be determined based on the received indicators.

In example embodiments of the present invention, signals received from the determined active set of base stations may be combined.

In example embodiments of the present invention, at least one channel characteristic of at least a portion of at least one downlink channel may be monitored at a mobile, and whether data is unavailable at a base station associated with the channel may be determined based on the monitored channel characteristic.

In example embodiments of the present invention, the channel may be a control channel. The portion of the channel may be the transport format indicator bits within the channel, and the channel characteristic may be a signal-to-noise ratio.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 4 is a flow chart illustrating a method for active set control, according to another example embodiment of the present invention, which may be performed at a mobile station.

DETAILED DESCRIPTION OF THE EXAMPLE EMBODIMENTS

Example embodiments of the present invention provide a method for determining an active set of serving base stations associated with a mobile station based on the availability or unavailability of data for transmission at one or more of the serving base stations in the active set. Example embodiments of the method may utilize a signaling mechanism (e.g., an implicit or explicit indicator) to indicate the unavailability of downlink data at one or more of the base stations. In example embodiments of the present invention, a mobile station may combine transmissions from serving base stations in an actual active set (e.g., a combining set or serving base stations, which actually contain data).

Figure 1:
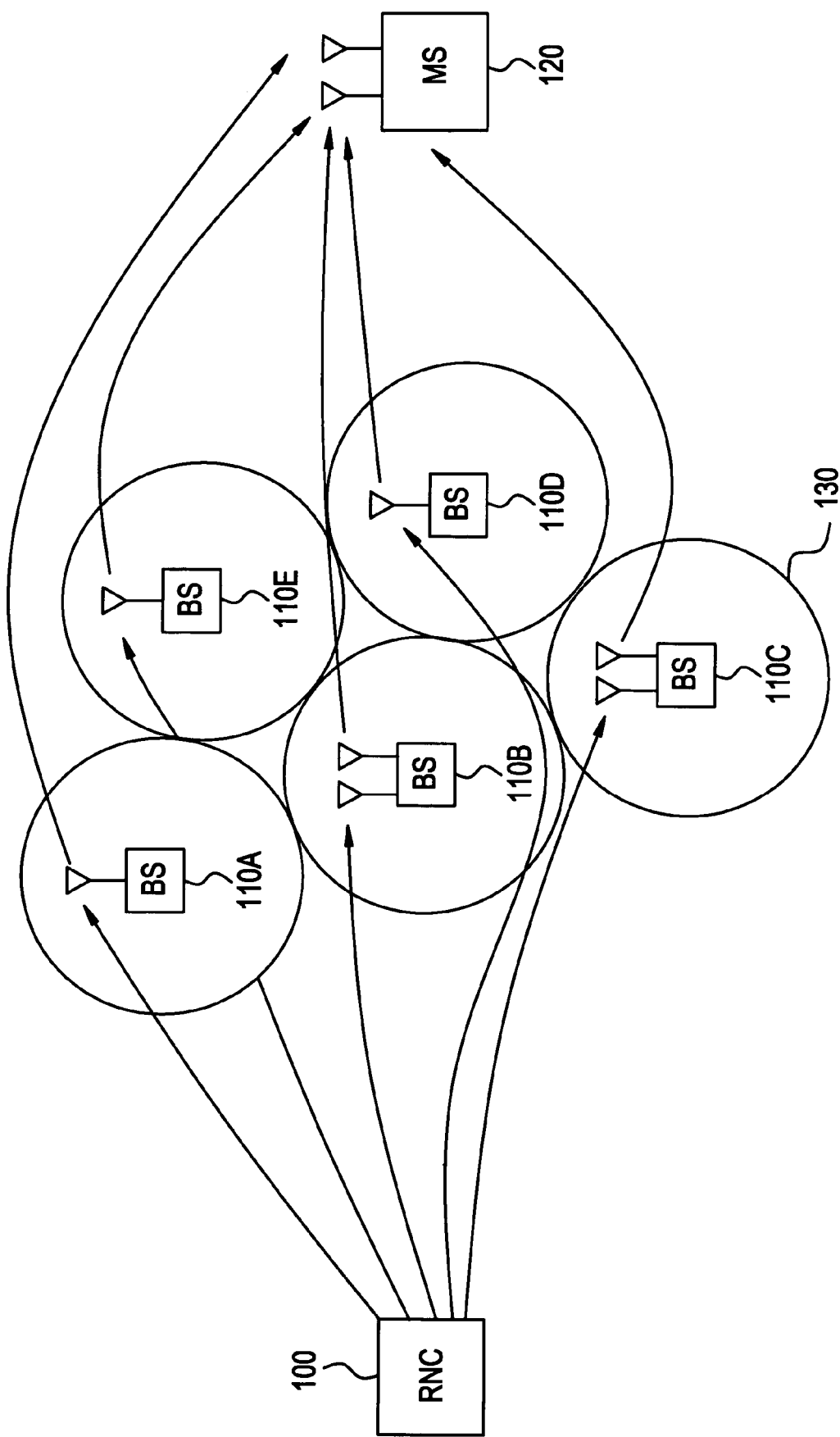
FIG. 1 illustrates a known high-level architecture for a radio access network (RAN) in which an example embodiment of the present invention may be implemented.

FIG. 1 illustrates a radio access network (RAN) in which an example embodiment of the present invention may be implemented, for example, a Universal Mobile Telecommunications System (UMTS) radio access network (RAN). The Universal Mobile Telecommunications System (UMTS) radio access network (RAN) may include a radio network controller 100, which may communicate with a mobile station 120 through one or more base stations 110a-110e (e.g., over one or more legs). The Universal Mobile Telecommunications System (UMTS) radio access network (RAN), as illustrated in FIG. 1, may offer teleservices (e.g., data, voice, short messaging services (SMS), etc.) and bearer services, which may allow information transfer between one or more entities (e.g., mobile stations (MS), base stations (BS), radio network controllers (RNC), etc.) in the Universal Mobile Telecommunications System (UMTS) radio access network (RAN, e.g., mobile-to-mobile, etc.). The Universal Mobile Telecommunications System (UMTS) radio access network (RAN) may offer both connection oriented and connectionless services for both Point-to-Point and Point-to-Multipoint communication.

The Universal Mobile Telecommunications System (UMTS) radio access network may utilize Wide band code-division multiple access (WCDMA) technology, which may be a direct sequence code-division multiple access (CDMA) system. In a direct sequence code-division multiple access (CDMA) system, user data may be multiplied with quasi-random bits derived from wide band code-division multiple access (WCDMA) spreading codes. In addition to channelization, codes may be used for synchronization and/or scrambling. Wide band code-division multiple access (WCDMA) systems may have, for example, two modes of operation: Frequency Division Duplex (FDD) and Time Division Duplex (TDD).

Referring back to FIG. 1, the radio network controller 100 may transmit information to the mobile station 120 via one or more base stations 110a-110e. The mobile station (or user equipment (UE)) 120 may be any device capable of accessing network services associated with the Universal Mobile Telecommunications System (UMTS) radio access networks (RAN).

The radio network controller 100 may perform a wide range of services in the Universal Mobile Telecommunications System (UMTS) radio access networks (RAN). For example, the radio network controller 100 may control operation and maintenance of the base stations 110a-110e, and/or serve as an interface between the mobile station 120, and other Universal Mobile Telecommunications System (UMTS) radio access networks (RAN), GPRS Service Nodes (SGSNs), Gateways (GGSNs), or any other wireless or terrestrial network or network device. The radio network controller 100 may control and manage the base stations 110a-110e, and/or, for example, soft-handoff of the mobile station 120. The radio network controller 100 may also manage the base stations 110a-110e while simultaneously performing other tasks, for example, switching and/or provisioning services of a mobile switching center (not shown) and/or 3G data network interfaces (not shown).

The radio network controller 100 may be connected to the base stations 110a-110e, for example, via a T1/E1 line. A T1/E1 aggregator may be used to deliver the data to the base stations 110a-110e, for example, over channelized OC-3 optical transport. The OC-3 pipe may be a direct connection to the radio network controller 100 or may be connected through more traditional transmission networks, for example, SONET/SDH networks, Ethernet networks, or any other suitable transmission network. The radio network controller 100 may further include several different kinds of interface cards, which may perform functions and/or interact with various other interfaces.

Referring again to FIG. 1, the radio network controller 100 may communicate with the mobile station 120 via the base stations 110a-110e. The base stations 110a-110e (or Node B's) may be physical units for radio transmission/reception between cells within the Universal Mobile Telecommunications System (UMTS) radio access networks (RAN). Depending on sectoring (omni/sector cells), the base stations 110a-110e may serve one or more cells within a Universal Mobile Telecommunications System (UMTS) radio access networks (RAN), and may support both frequency division duplex (FDD) and time division duplex (TDD) modes. The base stations 110a-110e may connect with the mobile station 120, for example, via a Wide-band code-division multiple access (WCDMA) Uu radio interface and with the radio network controller 100 via, for example, an Iub asynchronous transfer mode (ATM)-based interface or an internet protocol (IP) based interface. The base stations 110a-110e may be asynchronous transfer mode (ATM) termination points.

The base stations 110a-110e may convert data transmitted to, and received from, the mobile station 120. The base stations 110a-110e may also control forward error correction (FEC), rate adaptation, wide-band code-division multiple access (WCDMA) spreading/despreading, and quadrature phase shift keying (QPSK) modulation. The base stations 110a-110e may measure quality and/or strength of the connection and may determine the frame error rate (FER). The quality and/or strength of the connection and/or frame error rate (FER) may be transmitted to the radio network controller 100, for example, as a measurement report for handover (e.g., soft-handover) and/or macro diversity combining. The base stations 110a-110e may also be responsible for the frequency division duplex (FDD) softer handover.

The base stations 110a-110e may also participate in power control by enabling power adjustment in the mobile station 120 using downlink (DL) transmission power control (TPC) commands (which will be discussed in more detail below) via inner-loop power control. Values for inner-loop power control may be derived from the radio network controller 100 via outer-loop power control.

Figure 2:
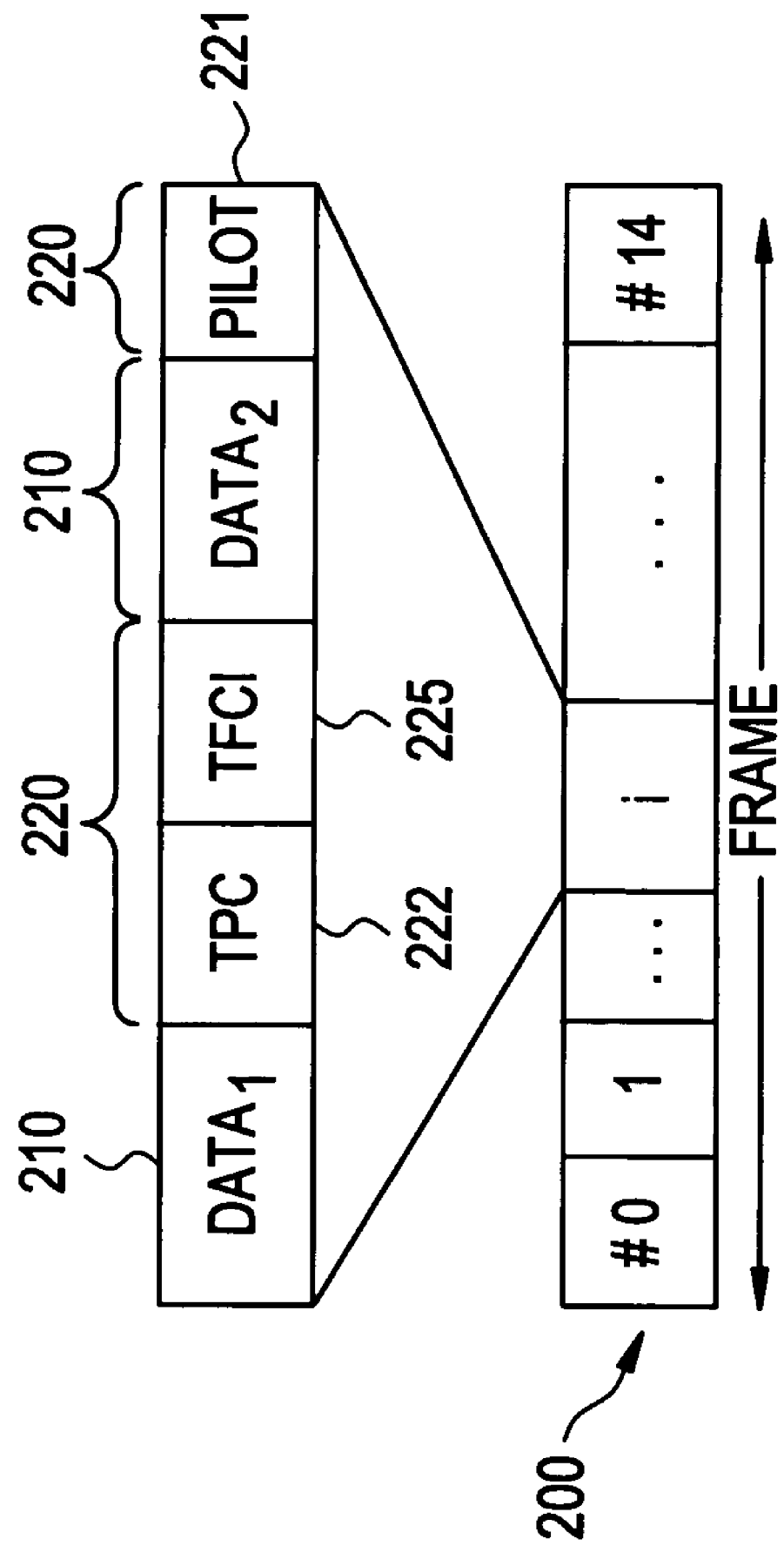
FIG. 2 illustrates an example frame structure in a downlink dedicated physical channel (DPCH) according to an example embodiment of the present invention.

The base stations 110a-110e may communicate with the mobile station 120 through downlink dedicated physical channels (DPCH). An example of the frame structure of the downlink dedicated physical channels (DPCH), according to an example embodiment of the present invention, is illustrated in FIG. 2. Each frame 200 may have a length of, for example, 10 milli-seconds (ms) and may be partitioned into 15 slots. Each slot may have a length of, for example, 2560 chips, which may correspond to one power-control period. The downlink dedicated physical channels (DPCH) may include one or more downlink dedicated physical data channels (DPDCH) shown as the data portions 210 in FIG. 2. The downlink dedicated physical channels (DPCH) may also include one or more downlink dedicated physical control channels (DPCCH) shown as the control portions 220 in FIG. 2. The downlink dedicated physical data channels (DPDCH) and the downlink dedicated physical control channels (DPCCH) may be time multiplexed.

The downlink dedicated physical data channels (DPDCHs) 210 may include information transmitted from one of the base stations 110a-110e. The downlink dedicated physical control channel 220 may include control information, for example, a pilot signal 221, transmit power control information (e.g., transmit power control (TPC) bits, which may be used and unused) 222, and a transport format combination indicator (TFCI) value 223.

The transport format combination indicator (TFCI) 223 may inform the mobile station 120 of the transport format of information (e.g., voice and/or data packets, frames, etc.) transmitted from the base stations 110a-110e. This transport format information may be used for combining information received over multiple legs (e.g., from more the one of the base stations 110a-110e), prior to decoding the information at the mobile station 120.

The mobile station 120 and the base stations 110a-110e may generate transmit power control (TPC) commands 222 to control each others transmit power. When the mobile station 120 communicates with, for example, a single base station 110a, a single transmit power control (TPC) command 222 may be received in each timeslot, and other transmit power control (TPC) bits may be unused.

Each of the base stations 110a-110e, which may maintain a radio link (e.g., a dedicated physical channel (DPCH)) with the mobile station 120 may be referred to as a serving base station for the mobile station 120. In example embodiments of the present invention, all, or less than all, of the base stations 110a-110e may be serving base stations for the mobile station 120, and maybe referred to as an active set of serving base stations.

Referring again to FIG. 1, the mobile station 120 may be in, for example, a soft-handover state. In a soft-handover state, the mobile station 120 may receive information from two or more of the base stations 110a-110e. As discussed above, transmission times may be scheduled for receiving information (e.g., data and/or voice packets) from the radio network controller 100. There may be a timing window during which a serving base station (e.g., 110a-110e) may expect information (e.g., data and/or voice packets) to arrive from the radio network controller 100.

Figure 3:
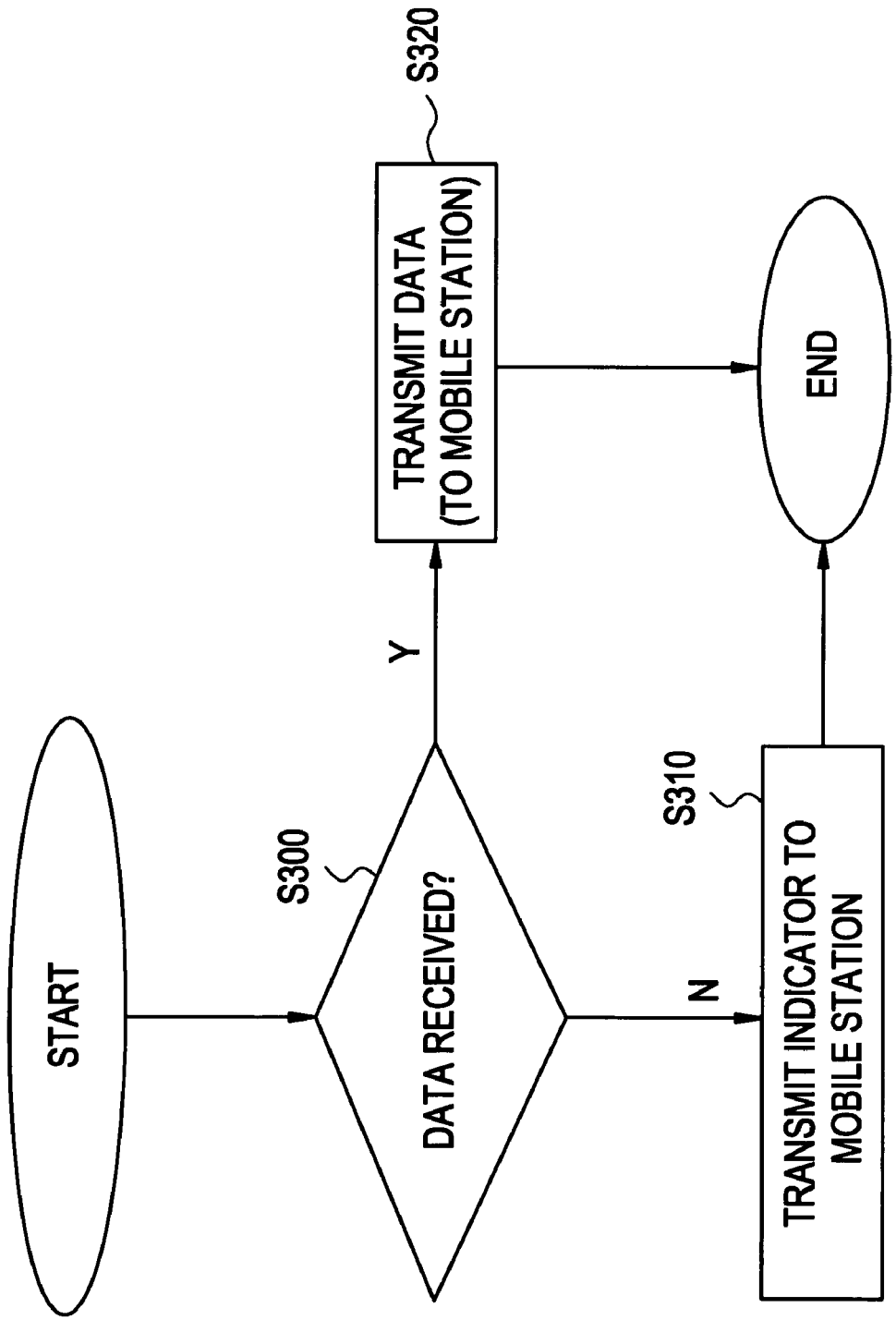
FIG. 3 is a flow chart illustrating a method for active set control, according to an example embodiment of the present invention, which may be performed at a base station.

With regard to FIG. 3, FIG. 3 is a flow chart illustrating a method for active set control, according to an example embodiment of the present invention, which may be performed by one or more of the base stations 110a-110e. At step S300, the base stations may determine whether expected data has been properly received, that is, for example, whether expected data has been received within an appropriate time window.

At step S320, if the base station determines that the expected data has been properly received (e.g., within the appropriate time window), the data may be transmitted to the mobile station 120.

Returning to step S300, if the base station determines that the expected data has not been properly received (e.g., not received within an appropriate time window), the base station may indicate such to the mobile station 120 via a signaling mechanism (e.g., an indicator), in step S310.

In an example embodiment of the present invention, the signaling mechanism (e.g., indicator) may be, for example, an unused transmit power control (TPC) bit or pattern of bits in the transmit power control (TPC) command discussed above. For example, referring to FIG. 1, the base station 110a may not receive expected data from the radio network controller 100 within an appropriate time window. Therefore, according to an example embodiment of the present invention, the base station 110a may utilize (e.g., set) an unused power control bit or pattern of bits to indicate to the mobile station 120 that the expected data has not been received from the radio network controller 100. Namely, the set power control bit or pattern of bits indicates that data is unavailable at the base station. For example, if a set power control bit or pattern of bits indicating that data is unavailable at the base station 110a is received at the mobile station 120, the mobile station 120 may temporarily exclude the base station 110a from the active set of serving base stations. The mobile station 120 may then combine information from the remaining serving base stations 110b-110e in the active set assuming these base stations were not excluded from the active set.

In another example embodiment of the present invention, the signaling mechanism (e.g., indicator) may be, for example, a special transmission format combination indicator (TFCI) value (e.g., zero). For example, again referring to FIG. 1, the base station 110a may not receive expected data from the radio network controller 100 within an appropriate time window. Therefore, according to an example embodiment of the present invention, the base station 110a may transmit a special transport format combination indicator (TFCI) value (e.g., zero) to the mobile station 120 indicating to the mobile station 120 that the expected data has not been received from the radio network controller 100. Namely, a special transmission format combination indicator (TFCI) value (e.g., zero) indicates that data is unavailable at the base station. For example, referring back to FIG. 1, if a special transmission format combination indicator (TFCI) value (e.g., zero) indicating that data is unavailable at the base station 110a is received at the mobile station 120, the mobile station 120 may temporarily exclude the base station 110a from the active set of serving base stations. The mobile station 120 may then combine information from the remaining serving base stations 110b-110e in the active set assuming these base stations were not excluded from the active set.

With regard to FIG. 4, FIG. 4 illustrates an example of a method, according to another example embodiment of the present invention, which may be performed at the mobile station 120, according to an example embodiment of the present invention. At step S400, the mobile station 120 may receive a transmission (e.g., at least a portion of a message, a data packet, etc.) from one or more of the base stations 110a through 110e, which may include at least one signaling mechanism (e.g., indicator), as described above with regard to FIG. 3. As further discussed above, the signaling mechanism (e.g., indicator) may be, for example, an unused transmit power control bit or pattern of bits and/or a special transport format combination indicator (TFCI) value (e.g., zero).

At step S410, the mobile station 120 may determine whether data is available or unavailable at the base stations 110a-110e based on the signaling mechanisms (e.g., indicators) received from the base stations 110a-110e. For example, if data is unavailable at the base stations 110a and 110b and available at the base stations 110c-110e, each of the base stations 110a and 110b may transmit a signaling mechanism (e.g., indicator such as an unset unused transmit power control bit or pattern of bits or a special transmission format combination indicator value of zero) to the mobile station 12C) indicating that data is unavailable, while the base stations 110c-110e may transmit a signaling mechanism (e.g., unset unused transmit power control bit or pattern of bits) indicating data is available or may not transmit a signaling mechanism. If the mobile station receives a signaling mechanism indicating that data is unavailable from the base stations 110a and 110b, the mobile station 120 may temporarily remove the base stations 110a and 110b from the active set of serving base stations, at step S420.

At step S430, the mobile station 120 may combine information from the remaining serving base stations 110c-110e in the active set.

Returning to step S410, if the mobile station 120 determines that all base stations 110a-110e have available data, the mobile station may combine and decode signals from all of the base stations 110a-110e.

Referring again to FIG. 4, the mobile station 120 may also determine whether data is available or unavailable at the base stations 110a-110e by monitoring or tracking channel characteristics for at least a portion of each downlink channel between each base station 110a-110e and the mobile station 120. Namely, the mobile station 120 may determine an active set of serving base stations by monitoring a signal-to-noise ratio in at least a portion of each of the downlink dedicated physical channels (DPCHs) between each base station 110a-110e and the mobile station 120. In an example embodiment of the present invention, for each base station 110a-110e, the mobile station 120 may monitor a signal-to-noise ratio in the control portion (e.g., the signal-to-noise ratio of the transport format combination indicator bits) of the dedicated physical channel (DPCH). In another example embodiment of the present invention, for each base station 110a-110e, the mobile station 120 may monitor the signal-to-noise ratio (SNR) in a data channel portion of the physical channel (e.g., DPDCH). In example embodiments of the present invention, channel characteristics (e.g., signal-to-noise ratio), for downlink dedicated physical channels (DPCHs) between each of the base stations 110a-110e and the mobile station 120 may be monitored in any well-known manner.

The channel characteristics monitored in each downlink dedicated physical channel (DPCH), associated with each base station 110a-110e, may be compared to threshold values, which may be estimated (e.g., using any well-known method or procedure). Subsequently, a determination may be made as to whether data is available or unavailable at each of the base stations 110a-110e based on comparisons between each of the monitored channel characteristics and the estimated channel characteristic. The estimated channel characteristic (e.g., an estimated signal-to-noise ratio) may be estimated for each downlink dedicated physical channel (DPCH) individually, or may be estimated once for all of the base stations.

For example, referring again to FIG. 1, a signal-to-noise ratio may be monitored in each of the dedicated physical channels (DPCHs) between the base stations 110a-110e and the mobile station 120. The monitored signal-to-noise ratios between each of the base stations 110a-110e and the mobile station 120 may be compared to a threshold signal-to-noise ratio. Although the steps discussed below are only discussed with regard to the downlink dedicated physical channel (DPCH) between the base station 110a and the mobile station 120, it will be understood that the same steps may be performed for each of the downlink dedicated physical channels (DPCHs) between the base stations 110b-110e and the mobile station 120.

For example, if the monitored signal-to-noise ratio in a portion of the dedicated physical channel (DPCH) between, for example, the base station 110a and the mobile station 120 is below the threshold, the mobile station 120 may temporarily exclude the base station 110a from the active set of serving base stations. The mobile station 120 may subsequently combine, and decode, information from the remaining serving base stations 110b-110e in the active set assuming these base stations have signal-to-noise ratios greater than the threshold. Otherwise, if the monitored signal-to-noise ratio in a portion of the dedicated physical channel (DPCH) between the base station 110a and the mobile station 120 is above a threshold, the mobile station 120 may keep the base station 110a in the active set of serving base stations. The mobile station 120 may subsequently combine, and decode, information from all of the serving base stations 110a-110e in the active set assuming these base stations have signal-to-noise ratios greater than the threshold. It will be understood that the same procedure may be used for each of the base stations 110b-110e, and thus a discussion thereof will be omitted.

Although example embodiments of the present invention have been described with regard to a Universal Mobile Telecommunications Network (UMTS) radio access network (RAN), it will be understood that example embodiments of the present invention may be utilized in any suitable wireless communication network.

Example embodiments of the present invention have been described with regard to an E1/T1 connection between the radio network controller (RNC) and the base stations. However, it will be understood that any suitable connection may be used, for example, a digital subscriber line (DSL), etc.

Example embodiments of the present invention have been described with regard to specific channel characteristics (e.g., signal-to-noise ratio (SNR)) and signaling mechanisms (e.g., indicators). However, it will be understood that any channel characteristic and/or any signaling mechanism (e.g., indicator), which may be used to indicate the availability or unavailability of data may be used.

Example embodiments of the present invention have been described with regard to the monitoring the signal-to-noise ratio (SNR) in a data channel portion of the physical channel (e.g., DPDCH). However, it will be understood that example embodiments of the present invention may also, or in the alternative, monitor a portion of the dedicated physical control channel (DPCCH). For example, example embodiments of the present invention may monitor the signal-to-noise ratio (SNR) in the transportation format combination indicator (TFCI) portion of the dedicated physical control channel (DPCCH).

In example embodiments of the present invention, the information transmitted from the radio network controller 100 to the mobile station 120 via the base stations 110a-110e may be any information transmitted within a Universal Mobile Telecommunications System (UMTS) radio access network (RAN). For example, voice and/or data transmitted via data and/or voice packets, frames, etc.

Example embodiments of the present invention may provide improved signal-to-noise ratio in the downlink of a radio access network, by selectively considering from which serving base stations within an active set to soft combine transmissions. Further, if a radio network controller is aware of networking problems (e.g., congestion, etc.), the radio network controller may selectively transmit data to serving base stations within an active set, which may remedy networking problems without diminishing transmission capacity.

Example embodiments of the present invention provide methods in which the radio network controller may more efficiently control congestion in backhaul networks. This may result in a reduction the cost of under provisioned backhaul networks.

The invention being thus described, it will be obvious that the same may be varied in many ways. Such variations are not to be regarded as a departure from the invention, and all such modifications are intended to be included within the scope of the invention.

We claim:

1. A method for active set control in a wireless network, the method comprising:
   receiving, at a mobile station, information from a plurality of base stations, the received information from at least one of the base stations indicating to the mobile station that at least one data packet has not been properly received from a radio network controller (RNC) by at least one of the base stations; and determining, at the mobile station, an active set of base stations based on the received information, wherein the determining excludes the base station from the active set of base stations if the at least one data packet has not been properly received.

2. The method of claim 1, wherein the determining step excludes the base station from the active set of base stations if an indicator indicates that the at least one data packet has not been properly received.

3. The method of claim 1, further comprising:

receiving, at the mobile station, an indicator from at least one base station indicating whether the at least one data packet has not been properly received; and wherein the determining step determines the active set of base stations based on the received indicator.

4. The method of claim 2, wherein the indicator is a power control bit or pattern of bits.

5. The method of claim 2, wherein the indicator is a transport format indicator value.

6. The method of claim 1, further comprising:

receiving, at the mobile station, an indicator from each of a plurality of base stations, the indicator indicating whether at least one said data packet has not been properly received; and determining the active set of base stations based on the received indicators.

7. The method of claim 6, wherein the determining step excludes from the active set of base stations those base stations that have an associated indicator indicating that at least one said data packet has not been properly received.

8. The method of claim 7, further comprising:

combining signals received from the determined active set of base stations.

9. The method of claim 1, further comprising:

monitoring at least one channel characteristic of at least a portion of at least one channel; and determining whether the at least one data packet has not been properly received at a base station associated with the channel based on the monitored channel characteristic.

10. The method of claim 9, wherein the channel is a control channel.

11. The method of claim 10, wherein the portion of the channel is the transport format indicator bits within the channel.

12. The method of claim 9, wherein the monitoring step monitors the entire channel.

13. The method of claim 9, wherein the channel characteristic is a signal-to-noise ratio.

14. The method of claim 1, further comprising:

combining signals received from the determined active set of base stations.

15. A method for active set control in a wireless network, the method comprising:

monitoring reception of data packets from a radio network controller (RNC) at a base station;

transmitting, from the base station, an indicator to a mobile station indicating to exclude the base station from an active set of base stations, if at least one of the data packets has not been properly received from the RNC at the base station, thereby causing the base station to be excluded from the active set of base stations.

16. The method of claim 15, wherein the indicator indicates whether the at least one data packet is unavailable at the base station.

17. The method of claim 15, wherein the indicator is a power control bit or pattern of bits.

18. The method of claim 15, wherein the indicator is a transport format indicator value.

* * * * *